(12) United States Patent
Baughman et al.

(10) Patent No.: US 10,620,694 B2
(45) Date of Patent: Apr. 14, 2020

(54) ADAPTIVE DIGITAL ENVIRONMENTS

(71) Applicant: International Business Machines Corporation, Armonk, NY (US)

(72) Inventors: Aaron K Baughman, Silver Spring, MD (US); Diwesh Pandey, Bangalore (IN); John P. Perrino, Hedgesville, WV (US); Todd R. Whitman, Bethany, CT (US)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 15/823,647

(22) Filed: Nov. 28, 2017

(65) Prior Publication Data

US 2019/0163258 A1    May 30, 2019

(51) Int. Cl.
   *G06F 3/01*    (2006.01)
   *G06T 13/80*   (2011.01)

(52) U.S. Cl.
   CPC .............. *G06F 3/011* (2013.01); *G06T 13/80* (2013.01)

(58) Field of Classification Search
   None
   See application file for complete search history.

(56) References Cited

U.S. PATENT DOCUMENTS

| 5,722,418 | A  | 3/1998  | Bro |
| 9,430,741 | B2 | 8/2016  | Baughman et al. |
| 9,498,704 | B1 | 11/2016 | Cohen et al. |
| 2009/0270693 | A1* | 10/2009 | Hyde ............... A61B 5/024 600/301 |
| 2013/0144537 | A1* | 6/2013 | Schalk ............... G06F 15/00 702/19 |
| 2016/0267799 | A1 | 9/2016 | Terzian et al. |
| 2018/0342106 | A1* | 11/2018 | Rosado ............ G06T 19/006 |

OTHER PUBLICATIONS

"Method and System for Detecting and Mapping Single Point of failure Over a Network". IP.com No. IPCOM000248615D. IP.com Electronic Publication Date: Dec. 21, 2016.
"Method and System for Sensing Group State based on a Combination of Wearable Sensor Data". P.com No. IPCOM000243492D. IP.com Electronic Publication Date: Sep. 24, 2015.
Delo "Microsoft's mood-based ad targeting patent | Marketing Magazine". Jun. 13, 2012. <http://www.marketingmag.ca/brands/microsofts-mood-based-ad-targeting-patent-54594>.
Duric et al. "Integrating Perceptual and Cognitive Modeling for Adaptive and Intelligent Human-Computer Interaction". Proceedings of the IEEE, vol. 90, No. 7, Jul. 2002. pp. 1272-1289.

(Continued)

*Primary Examiner* — Edward Martello
(74) *Attorney, Agent, or Firm* — Stephen R. Yoder

(57) ABSTRACT

Adapting a virtual space to the cognitive state of a user as measured through an immersive environment. The probability or confidence that a particular cognitive state is classified correctly is output by a probability density classifier. The predictors are from active features and inactive features acquired through the immersive environment to reverse engineer the cognitive state of the user in the real world. The overall goal of the immersive environment is initialized by the user with a default of nurturing the cognitive state of the user.

14 Claims, 5 Drawing Sheets

(56) References Cited

OTHER PUBLICATIONS

IPCOM000242934D "A Method and System for Detecting Cognitive Change of an Individual by Monitoring Communication Patterns". IP.com Electronic Publication Date: Sep. 1, 2015.

Sherstyuk et al. "Dynamic eye convergence for head-mounted displays improves user performance in virtual environments".I3D '12 Proceedings of the ACM SIGGRAPH Symposium on Interactive 3D Graphics and Games pp. 23-30. Costa Mesa, California—Mar. 9-11, 2012. pp. 23-30.

Witrisal et al. "Cognitive Radar for the Localization of RFID Transponders in Dense Multipath Environments" .2013 IEEE Radar Conference (RadarCon13). 2013 copyright IEEE.

Woollaston "Now Apple wants to know how you're feeling—and show you adverts based on your MOOD" Published: 08:58 Est, Feb. 3, 2014 | Updated: 09:13 EST, Feb. 3, 2014. <http://www.dailymail.co.uk/sciencetech/article-2550882/Apple-wants-know-youre-feeling-adverts-based-MOOD.html>.

Appendix P List of IBM Patents or Applications Treated as Related. Dated Dec. 20, 2017. Two pages.

Baughman et al. Original U.S. Appl. No. 15/841,371, filed Dec. 14, 2017.

\* cited by examiner

ADAPTIVE DIGITAL ENVIRONMENTS

BACKGROUND OF THE INVENTION

The present invention relates generally to the field of digital environments, and more particularly to environment adaptation.

Virtual reality is a computer technology that uses virtual reality headsets, physical spaces, and/or multi-projected environments to generate realistic images, sounds, and other sensations to simulate a user's physical presence in a digital environment.

Augmented reality is a live direct or indirect view of a physical, real-world environment whose elements are "augmented" by computer-generated or extracted real-world sensory input such as sound, video, graphics, and/or GPS data.

SUMMARY

According to an aspect of the present invention, there is a computer-implemented method, computer program product, and/or system that perform(s) the following steps (not necessarily in the following order): (i) collecting physical data of a user while immersed in a digital environment; (ii) identifying cognitive features of the user while immersed in the digital environment; (iii) classifying a cognitive state of the user based on the physical data and the cognitive features; and (iv) adapting the digital environment based on the cognitive state of the user. The physical data describes the physical condition of the user.

According to an aspect of the present invention, there is a system operable in an immersive environment; inputs to monitor immersive environment of a user; input for user to initiate system operation; analytic engine activated by user input to create one or more avatars in immersive environment to provoke the user to identify cognitive features, to analyze cognitive features by reverse engineering the cognitive state of the user, classifying the cognitive state by a probability density classifier, and using the one or more avatars or altering the immersive environment to nurture or change the cognitive state of the user as initialized by the user.

DETAILED DESCRIPTION

Figure 1:
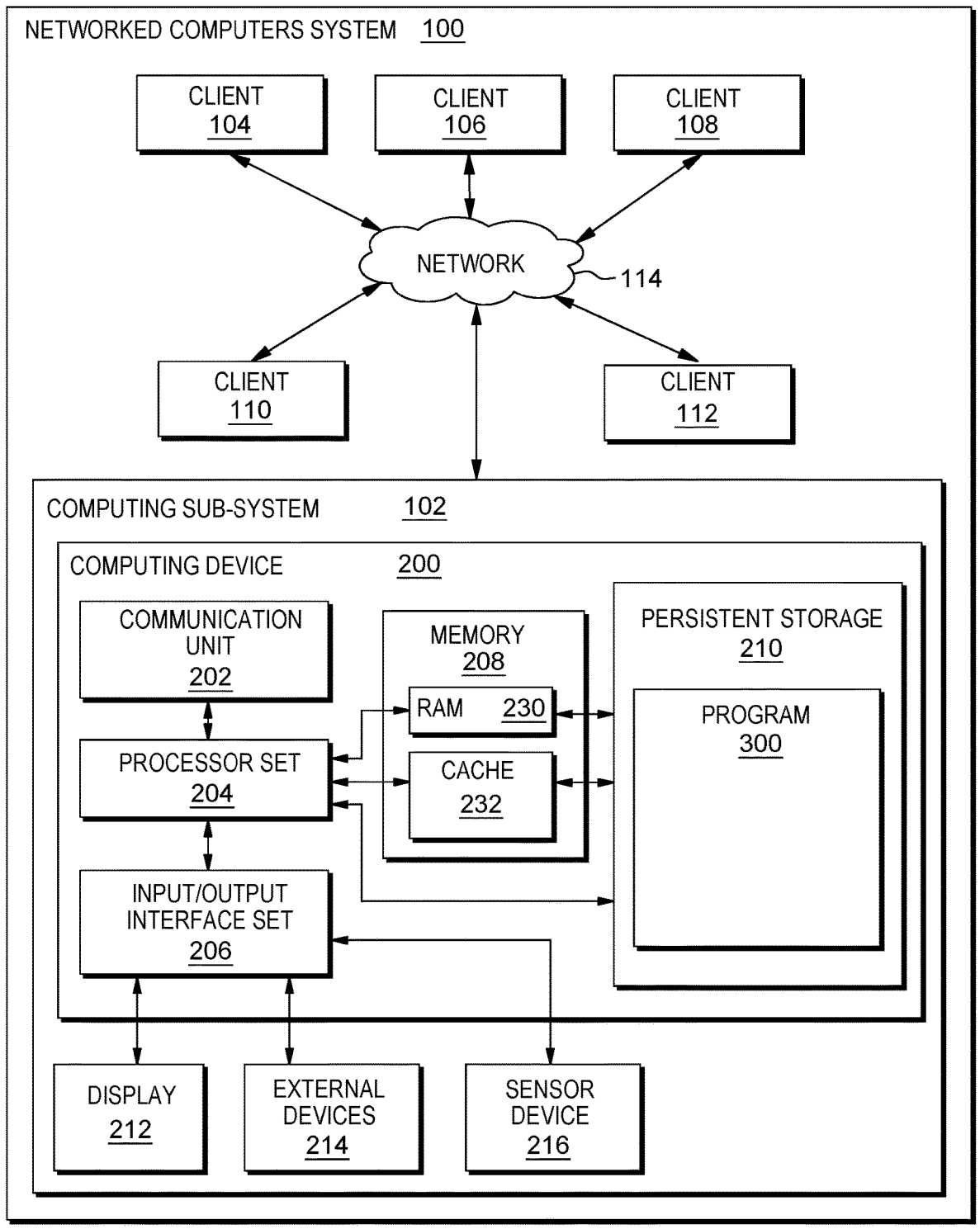
FIG. 1 is a block diagram view of a first embodiment of a system according to the present invention.

Adapting a virtual space to the cognitive state of a user as measured through an immersive environment. Immersive environments are created to interact with a user and allow the user to interact with the environment. Engagement of the user can vary depending on the cognitive state of the user. The probability or confidence that a particular cognitive state is classified correctly is output by a probability density classifier. The predictors are from active features and inactive features acquired through the immersive environment to reverse engineer the cognitive state of the user in the real world. The overall goal of the immersive environment is initialized by the user with a default of nurturing the cognitive state of the user. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: computing sub-system 102; client sub-systems 104, 106, 108, 110, 112; communication network 114; computing device 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computing device 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen. Display device 212 may provide a mechanism to display an immersive environment to a user.

Sensor device 216 provides a mechanism to capture data describing the physical condition of a user. For example, sensor device 216 may include sensors to capture biometric data, such as heart rate, perspiration, and/or eye movement. Sensor device 216 may be, for example, a heart rate sensor, blood pressure sensor, temperature sensor, eye movement sensor, and/or motion sensor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

An immersive environment, as used herein, refers to an artificial, interactive, computer-created scene, or world, within which a user can become immersed. The cognitive state of a user is described herein as being one of either a physical world cognitive state or an immersive environment cognitive state. An immersive environment cognitive state is a vicarious method of enabling enthalpy of self within a digital environment. When the digital environment becomes completely immersive to a user, the physical notion of enthalpy of self disappears and virtual self-awareness becomes prominent, which approaches real world self-awareness, but without regard to enthalpy of self because a person actually exists in the real world.

Program 300 identifies the cognitive state of a user engaging within an immersive environment via a digital environment system, such as one of client sub-systems 104, 106, 108, 110, and 112. These digital environment systems may be a virtual reality system, an augmented reality system, a conventional computer system having a display screen, or other type of digital environment now known or to be known in the future. The cognitive state of the user is actively identified by avatars that provoke a user into action. Questions may be asked by the avatar to prompt response, and virtual objects may be given to the user to monitor interplay. Inactive identification is performed based on open play within the immersive environment. Responsive to classifying the user within a cognitive state, the environment is adapted to nurture or change the cognitive state.

Cognitive states, or states of mind, identified or targeted when practicing various embodiments of the present invention vary widely and will depend upon the objectives of users and third party observers. Some embodiments of the present invention are directed to identifying one or more of the following cognitive states: (i) interestedness (fully engaged, overstimulated); (ii) excitedness; (iii) happy; (iv) verbal; (v) memory loss; (vi) readiness; (vii) consciousness; (viii) curiosity; (ix) confusedness; (x) certainty; (xi) doubtfulness; (xii) preoccupation; (xiii) morbidness; (xiv) inwardness; (xv) outwardness; (xvi) mental condition; (xvii) psychological condition; and/or (xviii) psychological state.

Figure 2:
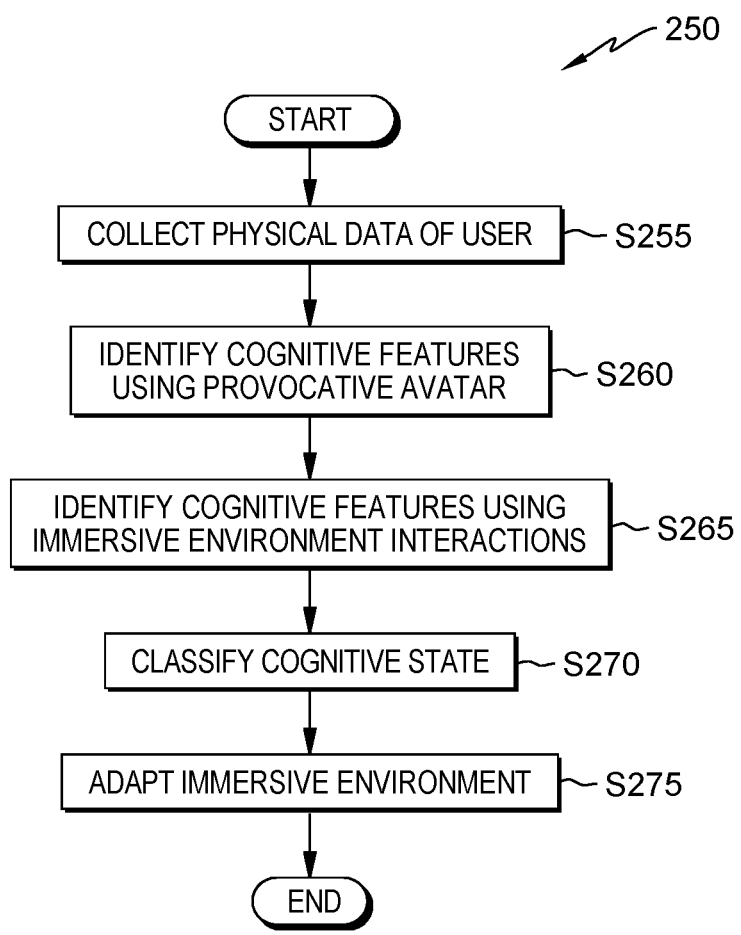
FIG. 2 is a flowchart showing a first embodiment method performed, at least in part, by the first embodiment system.
Figure 3:
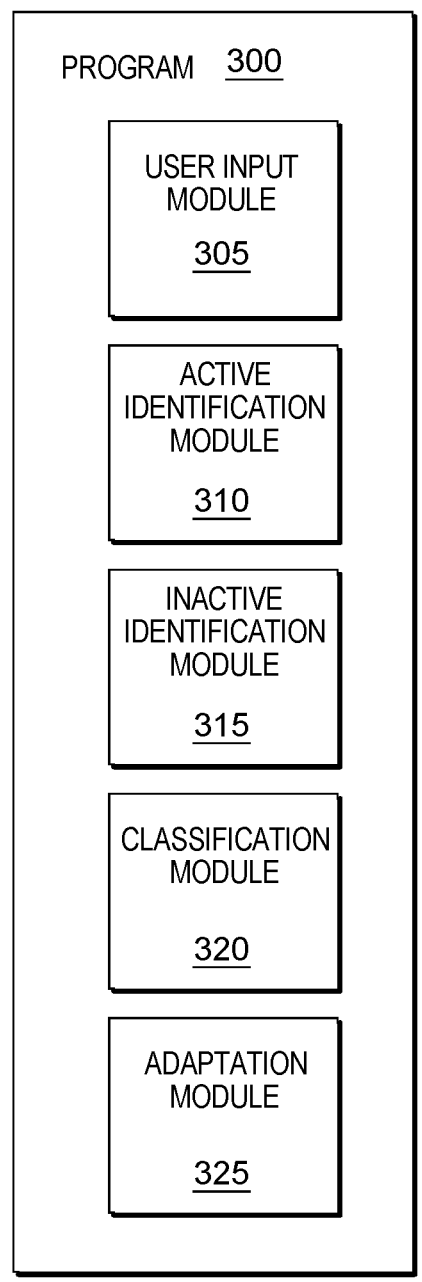
FIG. 3 is a block diagram view of a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where user input module ("mod") 305 collects physical data of the user. In this particular embodiment, user input mod 305 collects biometric data describing the current physical state of the user. Alternatively, physical data is collected by sensors located to observe physical movement, such as facial expression and movement of the body of the user. Alternatively, user input mod 305 obtains biometric data recorded during previous use of an immersive digital environment and associated with various physical states of the user to estimate a current physical state of the user based on collected physical state data.

Processing proceeds to step S260, where active identification mod 310 identifies cognitive features using a provocative avatar. In this particular embodiment, active identification mod 310 interacts with the user via an avatar to prompt a cognitive response from the user. For example, the avatar may ask the user a question or give the user an object in the digital environment while active identification mod 310 monitors how the user responds. In this step, user cognitive features are triggered by assertive interaction with specific objects and/or avatars.

Some embodiments of the present invention include a table correlating particular interaction attempts with certain response types in order to quickly assign a cognitive state based on responses by the user. For example, when the avatar offers an object designed to be held a particular way to the user, responses may be to not reach out toward the object, to hold the object improperly, or the hold the object properly. Each of these three responses may correspond to a pre-defined cognitive state. Alternatively, individual responses are recorded from previous engagements when the user's cognitive state was known so that a current response is mapped to the previous response to estimate a current cognitive state.

Processing proceeds to step S265, where inactive identification mod 315 identifies cognitive features using digital environment interactions. In this particular embodiment, inactive identification mod 315 monitors how the user interacts with the digital environment during open play. For example, inactive identification mod 315 may monitor how the user interacts with objects in a digital environment. An environment having no provocative avatar may be referred to as a passive environment. In some embodiments of the present invention, pre-defined cognitive states are assigned to user interaction with a particular passive environment. For example, a user presented with a digital environment containing alphabet building blocks, may stack the blocks or may assemble words using the available alphabet letters on the blocks.

Processing proceeds to step S270, where classification mod 320 classifies a cognitive state of the user. In this particular embodiment, classification mod 320 classifies the cognitive state of the user based on the physical state, active identification, and inactive identification of the user. For example, classification mod 320 may classify the level of engagement with the user. In another example, classification mod 320 may classify the emotional state of the user. In this embodiment, classification mod 320 utilizes a probability density function to create a confidence level of the classified cognitive state. For example, depending on how the user engages the building blocks, a certain cognitive state may be identified. Users who engage the building block environment by producing words may be identified as being in a verbal state while those users who build up and knock down the blocks may be identified as being in a curious state. Additional information is obtained when user interaction with a passive environment is correlated to a particular physical state of the user and further when correlated to feedback during the active identification process.

The probability density function takes into account the feedback from each identification data point. Some embodiments of the present invention include a potential cognitive state or states for each data point of feedback in a pre-defined table of cognitive states. Some embodiments of the present invention tailor the cognitive state identification to particular classes of individuals, such as by age or grade level achieved. Alternatively, cognitive states are known for certain individuals under certain conditions, so the table of cognitive states relates to the particular individual.

Processing proceeds to step S275, where adaptation mod 325 adapts the digital environment. In this embodiment, adaptation mod 325 adapts the digital environment based on the cognitive state of the user. For example, responsive to classifying the level of engagement of the user as low with a high confidence level, adaptation mod 325 may increase the activity of the provocative avatars and/or increase the number of avatars. In this embodiment, adaptation mod 325 adjusts the magnitude of the adaptation based on the confidence level of the classified cognitive state. Continuing with the example, if the determination of low engagement had a moderate confidence level, the increased activity of the avatars may be lower than if the confidence level were high.

III. Further Comments and/or Embodiments

Some embodiments of the present invention recognize the following facts, potential problems and/or potential areas for improvement with respect to the current state of the art: (i) active identification of cognitive features using provocative avatar; (ii) inactive identification of cognitive features using immersive environment interactions and/or movements; (iii) classification of cognitive state based on immersive active and inactive predictors; (iv) adaptation of immersive environment based on cognitive state classification; and/or (v) basing the magnitude of immersive environment on a confidence threshold of a probability density function.

Figure 4:
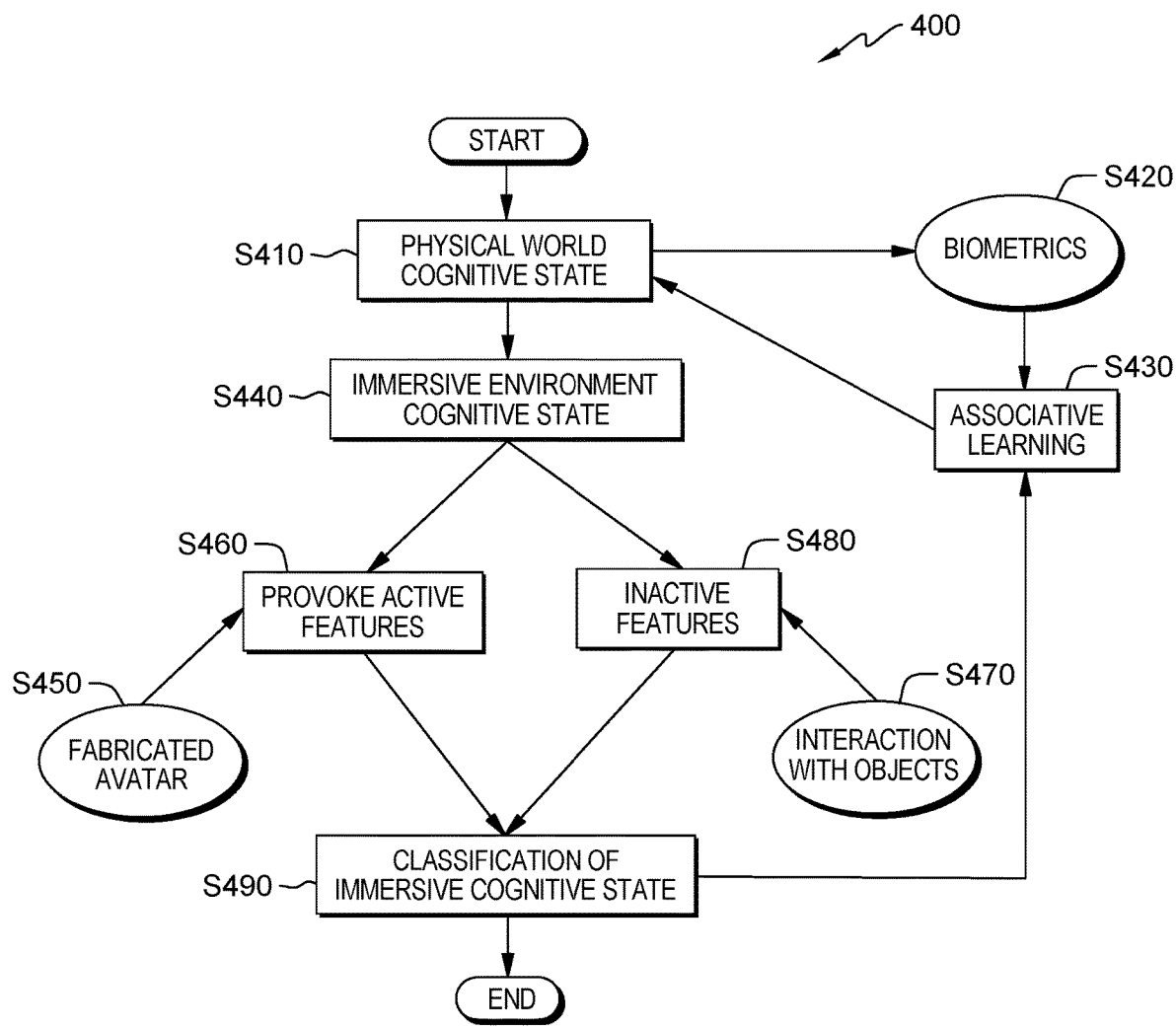
FIG. 4 is a flowchart showing a second embodiment method.
Figure 5:
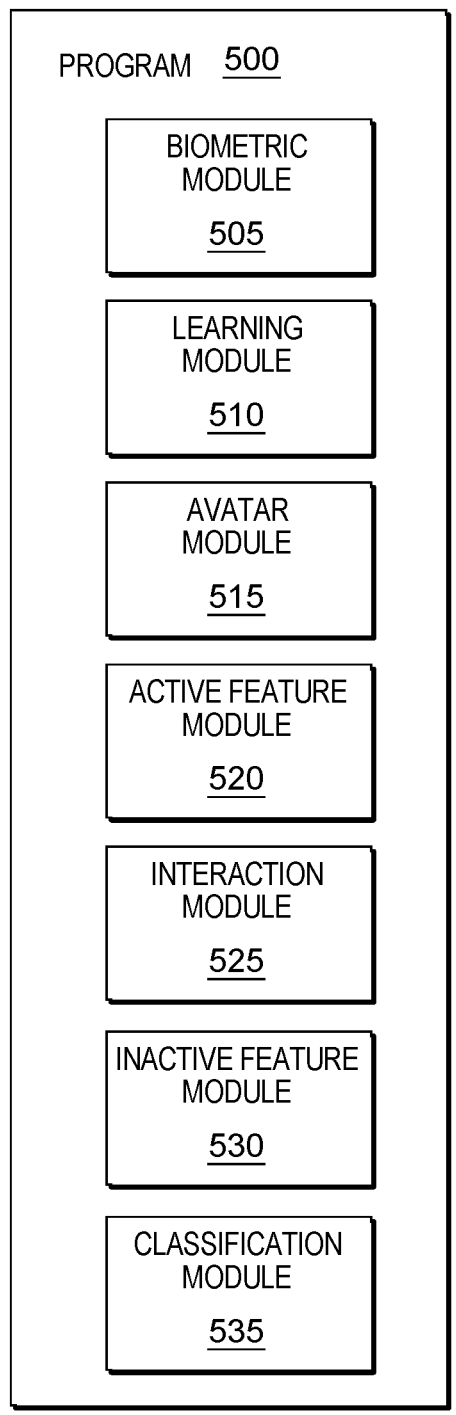
FIG. 5 is a block diagram view of a machine logic (for example, software) portion of a second embodiment system.

Further embodiments of the present invention are discussed in the paragraphs that follow with reference to FIGS. 4 and 5.

FIG. 4 shows flowchart 400 depicting a second embodiment method, performed on a system (not shown) similar to networked computer system 100, according to the present invention. FIG. 5 shows program 500 for performing at least some of the method steps of flowchart 400. This method will now be discussed, over the course of the following paragraphs, with extensive reference to FIG. 4 (for the method step blocks) and FIG. 5 (for the software blocks).

Processing begins at step S410, where the user experiences real-world self-awareness according to a physical world cognitive state. In this embodiment, the user may exhibit various levels of physical world engagement or various emotional states. For example, the user may be uninterested, fully engaged, or overstimulated. In another example, the user may be excited, happy, or sad.

Processing proceeds to step S420, where biometric mod 505 receives biometric measurements of the physical state of the user. For example, biometric mod 505 may receive heart rate or eye movement measurements. Physical state data collected while the user is experiencing real-world self-awareness or is in a physical world cognitive state may be referred to as physical data describing prior physical conditions of the user while not immersed in a digital environment. That is, if a user is not immersed in a digital environment, the user is considered to be experiencing a physical world cognitive state for the purposes of this description.

Processing proceeds to step S430, where learning mod 510 applies associative learning to associate the biometric measurements with the physical world cognitive state of the user. In this embodiment, learning mod 510 compares the biometric measurements with previously stored measurements to determine the physical world cognitive state of the user. For example, a measurement of an elevated heart rate may indicate the user is overstimulated.

Processing proceeds to step S440, where the user experiences virtual self-awareness according to an immersive environment cognitive state. In this embodiment, the user begins interacting with the immersive environment to experience an immersive environment cognitive state based on interactions with the immersive environment.

Processing proceeds to step S450, where avatar mod 515 interacts with the user via a fabricated avatar. In this embodiment, the fabricated avatar prompts the user for a response. For example, the avatar may ask the user a question or give the user an object in the immersive environment.

Processing proceeds to step S460, where active feature mod 520 provokes active features of the immersive environment cognitive state of the user. In this embodiment, active feature mod 520 directs the avatar to interact with the user and monitors the response of the user. For example, active feature mod 520 may receive an answer from the user in response to a question from the avatar.

Processing proceeds to step S470, where interaction mod 525 monitors the user interacting with objects. In this embodiment, interaction mod 525 monitors how the user interacts with passive objects in the immersive environment.

Processing proceeds to step S480, where inactive features mod 530 identifies inactive features of the immersive environment cognitive state of the user. In this embodiment, inactive features mod 530 monitors the activities of user outside of interactions with the avatar. For example, inactive features mod 530 may monitor how the user interacts with objects in the immersive environment during open play.

Processing proceeds to step S490, where classification mod 535 classifies the immersive environment cognitive state of the user. In this embodiment, classification mod 535 classifies the immersive environment cognitive state of the user based on the physical state, active identification, and inactive identification of the cognitive state features of the user. For example, classification mod 535 may classify the level of engagement with the user. In another example, classification mod 535 may classify the emotional state of the user. In this embodiment, classification mod 535 utilizes a probability density function to create a confidence level of the classified cognitive state. In this embodiment, classification mod 535 stores the classification data for future use.

Some embodiments of the present invention use physical world cognitive state data, such as physical data and cognitive features, as historic data for comparison to corresponding data collected while the user is in an immersive environment cognitive state when classifying the immersive environment cognitive state of the user.

Some embodiments of the present invention may include one, or more, of the following features, characteristics and/or advantages: (i) active identification of cognitive features using provocative avatar; (ii) inactive identification of cognitive features using immersive environment interactions and/or movements; (ii) classification of cognitive state based on immersive active and/or inactive predictors; (iv) adaptation of immersive environment based on cognitive state classification; and/or (v) basing the magnitude of the immersive environment on confidence of a probability density function; (vi) training the associative learning through interaction with the user; and/or (vii) training the associative learning through interactions with family and/or friends of the user.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Digital environment: includes any combination of immersive environment and/or virtual space.

Immersive environment: includes any combination of virtual reality, augmented reality, and/or virtual space.

Cognitive state: a measure of the engagement level and emotional state of the user.

Avatar: an object or character in the immersive environment that interacts with the user.

Virtual space: a computer generated environment.

Open play: unstructured interactions with the immersive environment.

What is claimed is:

1. A computer program product comprising a computer readable storage media having stored thereon:
program instruction to collect immersive physical data while a user is immersed in an immersive environment that supports virtual self-awareness, wherein the immersive physical data describes a physical condition of the user;
program instructions to identify cognitive features associated with the user while the user physically interacts with virtual objects in the immersive environment, the cognitive features describing how the user physically interacts with the virtual objects;
program instructions to classify a cognitive state of the user based on the immersive physical data and the cognitive features;
program instruction to determine a magnitude of adaptation based on a confidence level associated with the classified cognitive state, the confidence level indicating a correct classification of the cognitive state; and program instructions to adapt the immersive environment according to the magnitude of adaptation.

2. The computer program product of claim 1, wherein the program instructions to identify the cognitive features, further comprise:
   program instructions to provoke the user by presenting an avatar to the user within the immersive environment; and
   program instructions to monitor a cognitive response of the user while interacting with the avatar.

3. The computer program product of claim 1, wherein the program instructions to identify the cognitive features of the user, further comprise:
   program instructions to monitor a cognitive response of the user while interacting with the virtual objects.

4. The computer program product of claim 1, wherein the program instructions to collect the physical data of the user, further comprise:
   program instructions to collect the immersive physical data via a sensor.

5. The computer program product of claim 4, wherein the sensor is a motion sensor.

6. The computer program product of claim 1, wherein the program instructions to classify the cognitive state of the user, further comprise:
   program instructions to compare the immersive physical data to real-world physical data describing physical conditions of the user while not immersed in the immersive environment.

7. The computer program product of claim 1, wherein determining the
   magnitude of adaptation is further based on a comparison of the cognitive state of the user and a target cognitive state.

8. A computer system comprising:
   a processor set; and
   a computer readable storage media;
   wherein:
   the processor set is structure, located, connected, and/or programmed to execute program instructions stored on the computer readable storage media; and
   the program instructions include:
   program instruction to collect immersive physical data while a user is immersed in an immersive environment that supports virtual self-awareness, wherein the immersive physical data describes a physical condition of the user;
   program instructions to identify cognitive features associated with the user while the user physically interacts with virtual objects in the immersive environment, the cognitive features describing how the user physically interacts with the virtual objects;
   program instructions to classify a cognitive state of the user based on the physical data and the cognitive features;
   program instructions to determine a magnitude of adaptation based on a confidence level associated with the classified cognitive state, the confidence level indicating a correct classification of the cognitive state; and
   program instructions to adapt the immersive environment according to the magnitude of adaptation.

9. The computer system of claim 8, wherein the program instructions to identify the cognitive features of the user, further comprise:
   program instructions to provoke the user by presenting an avatar to the user within the immersive environment; and
   program instructions to monitor a cognitive response of the user while interacting with the avatar.

10. The computer system of claim 8, wherein the program instructions to identify the cognitive features of the user, further comprise:
    program instructions to monitor a cognitive response of the user while interacting with the virtual objects.

11. The computer system of claim 8, wherein the program instructions to collect the immersive physical data of the user, further comprise:
    program instructions to collect the immersive physical data via a sensor.

12. The computer system of claim 11, wherein the sensor is a motion sensor.

13. The computer system of claim 8, wherein the program instructions to classify the cognitive state of the user, further comprise:
    program instructions to compare the immersive physical data to real-world physical data describing physical conditions of the user while not immersed in the immersive environment.

14. The computer system of claim 8, wherein the program instruction to
    determine the magnitude of adaptation is further based on a comparison of the cognitive state of the user and a target cognitive state.

* * * * *